US008863144B2

(12) United States Patent
Iyengar et al.

(10) Patent No.: US 8,863,144 B2
(45) Date of Patent: Oct. 14, 2014

(54) METHOD AND APPARATUS FOR DETERMINING RESOURCES CONSUMED BY TASKS

(75) Inventors: Arun Kwangil Iyengar, Yorktown Heights, NY (US); Hongbo Jiang, Wuhan (CN); Erich M. Nahum, New York, NY (US); Wolfgang Segmuller, Valhalla, NY (US); Asser Nasreldin Tantawi, Somers, NY (US); Charles P. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 12/723,914

(22) Filed: Mar. 15, 2010

(65) Prior Publication Data
US 2011/0225594 A1   Sep. 15, 2011

(51) Int. Cl.
*G06F 9/46* (2006.01)
*G06F 15/173* (2006.01)
*G06F 9/50* (2006.01)

(52) U.S. Cl.
CPC *G06F 9/46* (2013.01); *G06F 9/505* (2013.01); *G06F 2209/501* (2013.01); *G06F 2209/5019* (2013.01)
USPC ............ 718/105; 718/100; 718/104; 709/226

(58) Field of Classification Search
None
See application file for complete search history.

(56) References Cited

U.S. PATENT DOCUMENTS

| | | | | |
|---|---|---|---|---|
| 7,444,640 B2 * | 10/2008 | Partanen | ........................ | 718/105 |
| 7,743,378 B1 * | 6/2010 | Markov | ........................ | 718/102 |
| 8,059,653 B1 * | 11/2011 | Wang et al. | .................... | 370/392 |
| 8,095,681 B2 * | 1/2012 | Yumoto et al. | ................. | 709/232 |
| 8,136,114 B1 * | 3/2012 | Gailloux et al. | ............... | 718/104 |
| 2002/0194251 A1 | 12/2002 | Richter et al. | | |
| 2004/0095938 A1 * | 5/2004 | Ryu | ............................... | 370/392 |
| 2004/0098718 A1 * | 5/2004 | Yoshii et al. | ................... | 718/100 |
| 2005/0166195 A1 * | 7/2005 | Kawahito | ....................... | 717/154 |
| 2005/0188364 A1 * | 8/2005 | Cockx et al. | .................... | 717/159 |
| 2006/0036747 A1 * | 2/2006 | Galvin et al. | ................. | 709/228 |
| 2008/0046895 A1 * | 2/2008 | Dillenberger et al. | ......... | 718/105 |
| 2008/0086567 A1 * | 4/2008 | Langen et al. | ................. | 709/230 |
| 2010/0095299 A1 * | 4/2010 | Gupta et al. | ................... | 718/103 |
| 2010/0107174 A1 * | 4/2010 | Suzuki et al. | .................. | 718/104 |
| 2011/0154353 A1 * | 6/2011 | Theroux et al. | ................ | 718/104 |

OTHER PUBLICATIONS

David R. Crowe, "NovAtel's Novel Approach to CPU Usage Measurement," Software-Practice and Experience, May 1991, pp. 465-477, vol. 21, No. 5.

(Continued)

*Primary Examiner* — Abdullah Al Kawsar
*Assistant Examiner* — Tammy Lee
(74) *Attorney, Agent, or Firm* — Preston J. Young; Ryan, Mason & Lewis, LLP

(57) ABSTRACT

In a computer system comprising a plurality of computing devices wherein the plurality of computing devices processes a plurality of tasks and each task has a task type, a method for determining overheads associated with task types comprises the following steps. Overheads are estimated for a plurality of task types. One of the plurality of computing devices is selected to execute one of the plurality of tasks, wherein the selection comprises estimating load on at least a portion of the plurality of computing devices from tasks assigned to at least a portion of the plurality of computing devices and the estimates of overheads of the plurality of task types. One or more of the estimates of overheads of the plurality of task types are varied.

21 Claims, 10 Drawing Sheets

(56) References Cited

OTHER PUBLICATIONS

H. Jiang et al., "Load Balancing for SIP Server Clusters," Proceedings of INFOCOM 2009, 9 pages.

J. Rosenberg et al., "An Offer/Answer Model with the Session Description Protocol (SDP)," IETF, RFC 3264, Jun. 2002, 25 pages.
J. Rosenberg et al., "SIP: Session Initiation Protocol," IETF, RFC 3261, Jun. 2002, 269 pages.

* cited by examiner

METHOD AND APPARATUS FOR DETERMINING RESOURCES CONSUMED BY TASKS

FIELD OF THE INVENTION

The present invention relates generally to techniques for determining overhead consumed by a particular task or job and, more particularly, to techniques for determining relative computer processing overheads needed by various requested tasks or jobs.

BACKGROUND OF THE INVENTION

In many cases, with respect to computer systems, it is desirable to know the performance/resource consumption (e.g., central processing unit (CPU) cycles consumed) of a task or job performed by a given computer system. Ideally, one would like to run the task independently on the system and measure how much CPU time the task consumes. It may not be possible, however, to isolate the job or task on an individual system in order to make accurate measurements.

For example, suppose one has a protocol with many different steps and/or request types. One wants to know the overhead consumed by a particular step/request type. Since a realistic implementation of the protocol would involve many different steps/request types running on the same machine concurrently, it may be difficult or even impossible to isolate a single step/request type on a machine and realistically measure its performance. The net result is that one has to rely on approximations which can be inaccurate.

SUMMARY OF THE INVENTION

Principles of the invention provide techniques for determining overhead consumed by a particular task or job.

In one embodiment, in a computer system comprising a plurality of computing devices wherein the plurality of computing devices processes a plurality of tasks and each task has a task type, a method for determining overheads associated with task types comprises the following steps. Overheads are estimated for a plurality of task types. One of the plurality of computing devices is selected to execute one of the plurality of tasks, wherein the selection comprises estimating load on at least a portion of the plurality of computing devices from tasks assigned to at least a portion of the plurality of computing devices and the estimates of overheads of the plurality of task types. One or more of the estimates of overheads of the plurality of task types are varied.

The method also may comprise determining maximum task rates that can be achieved for at least two different estimated overheads. Furthermore, the overheads preferably comprise relative overheads whereby the overhead for a first task type is defined relative to the overhead of a second task type. The estimated overheads that result in a maximum task rate that can be handled are used to determine at least one absolute overhead for a task.

Advantageously, illustrative principles of the invention provide methods of determining resource consumption of tasks or jobs which cannot easily be isolated.

These and other objects, features and advantages of the present invention will become apparent from the following detailed description of illustrative embodiments thereof, which is to be read in connection with the accompanying drawings.

DETAILED DESCRIPTION

Figure 1:
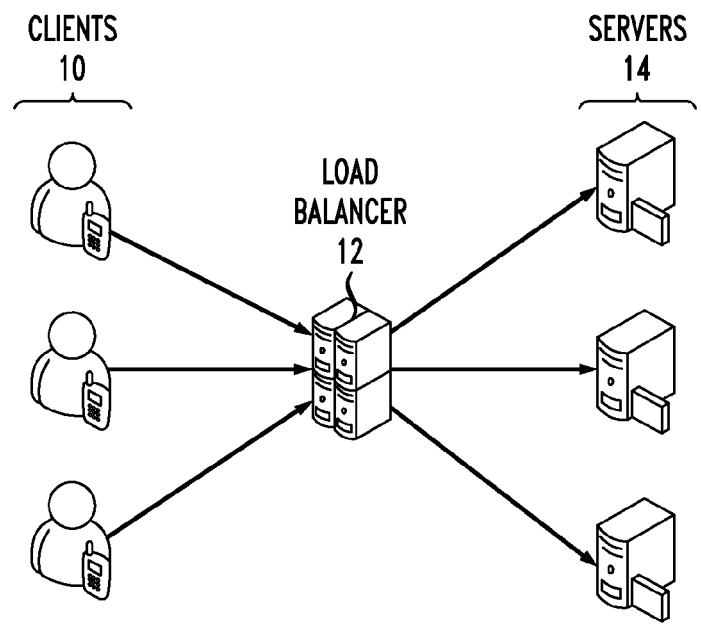
FIG. 1 depicts a load balancing system in accordance with an embodiment of the present invention.

While illustrative embodiments of the invention are described below in the context of the Session Initiation Protocol (SIP), the HyperText Transfer Protocol (HTTP), and a telephony application, it is to be understood that principles of the invention are not so limited. That is, principles of the invention are applicable to a broad range of protocols and applications wherein it is desirable to determine computer processor usage or overhead consumed by a particular task or job.

As used herein, the terms "task" and "job" are used interchangeably and generally refer to one or more steps of one or more functions performed by a computer system.

Also, as used herein, the term "overhead" generally refers to the processing time (e.g., in terms of percentage of use of a given resource) needed by a computer system (or a part of a computer system) to perform one or more tasks or jobs, as well as generally referring to resource consumption, network usage, input/output (I/O) usage, memory consumption, storage consumption, combinations thereof, and/or the like.

As will be explained herein, embodiments of the invention advantageously provide methods of determining resource consumption of tasks or jobs which cannot easily be isolated. One main advantage is that much more accurate determinations of resource consumption can be made than with existing methods.

In one illustrative embodiment, a method for determining CPU overhead has been developed and verified its efficacy for the SIP protocol. SIP comprises multiple different request types (e.g., INVITE, BYE, CANCEL) which consume different overheads.

In one illustrative embodiment, a multi-node system is utilized with a load balancer in front of each node. This is illustrated in the client-server communication environment of FIG. 1. The load balancer 12 receives one or more requests from one or more client nodes 10 and sends the one or more requests to one or more back-end nodes, e.g., servers 14. It is to be appreciated that the term "client" can generally refer to any computing device (e.g., cell phone, laptop, smart phone, etc.) capable of communicating (sending requests and receiving responses) via a communication protocol with one or more other clients or one or more servers. The term "server" can generally refer to any computing device capable of communicating (receiving requests and sending responses) via a communication protocol with one or more clients or one or more other servers. However, it is to be understood that a given computing device may function as both a client and a server.

In order to optimize throughput, it has been realized that efficient performance is obtained by an algorithm known as least work left (LWL) which estimates the amount of work that a server has left to do of the work assigned to it by the load balancer. This LWL algorithm will be explained below; in addition, see, e.g., H. Jiang et al., "Load Balancing for SIP Server Clusters," Proceedings of INFOCOM 2009, the disclosure of which is incorporated by reference herein.

Consider a communications protocol that has multiple different request types, such as the SIP protocol. For simplicity, let us first assume that there are only two different request types, t1, and t2. Assume one would like to estimate the CPU resources consumed by both request types. Assume further that we have some initial estimate of the relative overhead of t1 and t2, of and o2 respectively. By "relative overhead" it is meant that the overheads do not have to be in absolute units like GFLOPS (i.e., a finite number of floating point operations when describing processor usage). For example, o1 can be 1 and o2 can be 2. The units do not matter. What is significant, in this example, is the fact that o2 is twice that of o1.

The LWL load balancing algorithm sends requests by using of and o2 to make load balancing decisions. This initial estimate is not likely to result in optimal throughput. The system adaptively varies the ratio of o1 and o2 until it finds a ratio resulting in the best throughput. This ratio, $r_{opt}$, is the ratio of the CPU overhead consumed by t1 and t2. One can determine the average CPU time per request for t1 and t2 from $r_{opt}$ and the total number of requests handled by a server in a given amount of time.

In one embodiment, we use this approach for load balancing using the SIP protocol in which requests types were INVITE and BYE. It has been realized that throughput is maximized when the weights used for load balancing using LWL corresponded to the ratio of CPU resources consumed by the INVITE and BYE requests.

In a more general situation, there might be more than two different request types. The system would vary weights until an optimal throughput is achieved. The weights resulting in the optimal throughput are then used to calculate the average CPU resources consumed by each request type.

Figure 2:
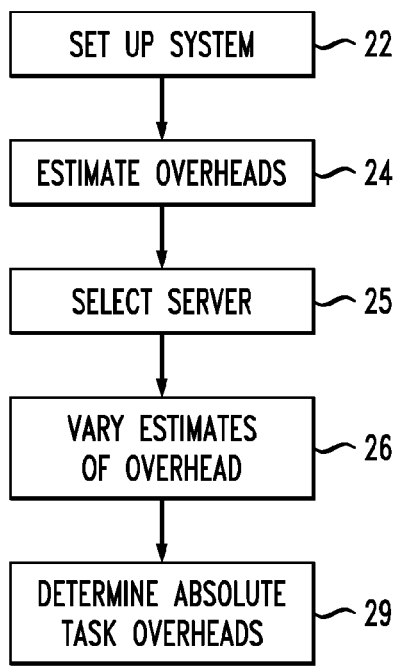
FIG. 2 depicts a method for determining resources consumed by tasks in accordance with an embodiment of the present invention.

FIG. 2 depicts a method for determining resources consumed by tasks in accordance with an embodiment of the present invention. Assume that we have a plurality of tasks, for which each task has a task type. The overhead of a task is related to its type. For example, the tasks could be requests belonging to a particular protocol such as HTTP or SIP. The type of a task could be the type of request (e.g., in the SIP protocol, request types include INVITE and BYE). The tasks could be other work to be done on computers which are not related to protocols as well. It is desired to determine the overhead of tasks.

As shown, in step 22, a load balancing system similar to the one in FIG. 1 is set up. In FIG. 1, to reiterate, clients 10 send tasks to a load balancer 12 which balances the load among multiple servers 14. Note that the following steps of the method may be performed by the load balancer 12, by one or more separate computing devices in the system, or by some combinations thereof.

In step 24, estimates of overheads for task types are determined. For example, if the tasks comprise SIP requests, overheads for INVITE and BYE requests could be estimated in step 24. These are expected to be best guesses based on knowledge of the system. They do not have to be obtained in a rigorous, accurate way, and thus the initial estimates can be wrong. A key advantage of the invention is that it provides accurate values for the overheads from inaccurate estimates.

In step 25, the load balancer assigns requests to servers by attempting to pick a least loaded server. One method is to pick a least loaded server based on tasks already assigned to the servers and the estimates of relative overheads of task types. For example, suppose that servers s1 and s2 have the same request processing capacity. If an INVITE request has a relative weight of 1.75 compared to a BYE and server s1 has one INVITE request assigned to it while server s2 has a BYE request assigned to it, s2 is less loaded and should be given preference for receiving new requests. On the other hand, if s1 has five times the request handling capacity of s2, then s1 is less loaded than s2 (even though the amount of work currently assigned to s1 is higher); in this case, s1 should be given preference for receiving new requests.

Least work left (LWL) load balancing algorithms are those in which the server is selected based on estimates of which server has the least amount of work left to do. Such algorithms could be used for step 25. Note that if the servers do not have the same request handling capacities, the amount of work servers have left to do should be normalized by request handling capacity in making load balancing decisions. Below we will describe in detail an embodiment of step 25 which is the TLWL load balancing algorithm for handling SIP requests.

In step 26, the estimates for overheads of task types are varied in order to determine a set of estimates resulting in a best performance (see illustrative embodiment described below in context of FIGS. 3A and 3B). For example, in the case of SIP, the relative overheads of INVITE and BYE could be varied until values which result in near optimal performance are determined. This is typically when tasks are handled at the highest possible (maximum) rate before the system becomes overloaded. After the overhead estimates are varied, the throughput of the system is determined.

Figure 3A:
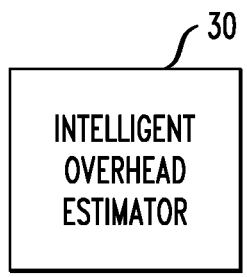
FIG. 3A depicts a component module for varying estimates of relative overheads in accordance with an embodiment of the present invention.

In step 29, the absolute performance of each task type (absolute task overheads) from the best estimates of relative performance is determined. Recall that relative overheads can be just numbers without units. Absolute overheads have units (e.g., GFLOPS, seconds of CPU time on a specific hardware platform) indicating what the specific numbers mean. Step 29 could be done in several ways. For example, one way would be if the performance of the system over several transactions is known. For example, suppose that 300,000 SIP transactions containing 50% BYE and 50% INVITE transactions require 150 seconds on a known hardware platform and the relative overheads resulting in optimal throughput are 1 for a BYE request and 1.75 for an INVITE request. In addition, processing is CPU limited (input/output (I/O) overhead is insignificant); the CPU is near 100% utilization as a result of the 300,000 SIP transactions. Then we have:

2000 transactions/sec
Average transaction: 0.5 milliseconds (ms) CPU time
INVITE: 0.63 ms CPU time
BYE: 0.36 ms CPU time FIG. 3A depicts a component module 30 for intelligently varying the estimates of load/overhead, e.g., operation performed in step 26. FIG. 3B depicts a method performed by the component module 30. It should be noted, however, that FIG. 3B is just one way of implementing the component module 30 and is typically used when there are more than two task types. Other methods could also be used for implementing the component module 30. Note that a "node," as referred to herein, may be a server (e.g., server 14 in FIG. 1); however, a node could be a given client (e.g., client 10 in FIG. 1) if the given client device also processes requests as opposed to just sending them out. Also, the load balancer may also be considered a node.

Figure 3B:
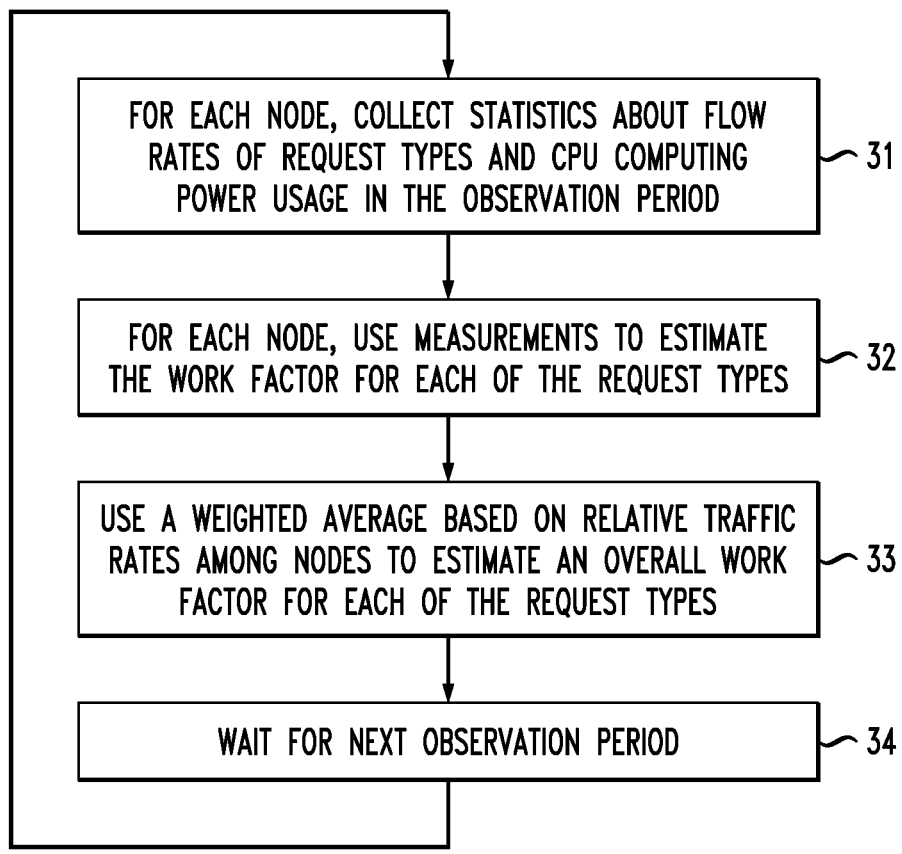
FIG. 3B depicts a method for varying estimates of relative overheads in accordance with an embodiment of the present invention.

In the case of multiple request types, the method for estimating the work factors (or overheads) for each of the request types includes a number of steps that are executed periodically, as illustrated in FIG. 3B. Assume that a monitor is installed on each of the nodes. Each monitor works periodically over an observation period. A typical length of such an observation period is about 10 or 15 seconds for exemplary applications considered. The function of the monitor is to collect statistics, in step 31, about the load and computing power consumption during the observation period. The monitor on a node gathers statistics about the request rate of each of the request types flowing into that node. Further, the rate of consumption of CPU computing power on the node due to the collective processing of said request types is calculated. The rate of CPU computing power consumption is simply the product of CPU utilization of the process providing services to the request types by the total CPU processing speed (in cycles/sec).

Given the data collected, an agent on each node estimates the work factor, in step 32, for each of the request types. Note that the measured CPU computing power consumption of the node is the sum over all request types of the product of the measured request rate and the unknown work factor. This gives rise to a linear equation in the work factors. There are several estimation methods for solving this set of linear equations. The linear regression method uses a number of sample points from the past in addition to the present data to estimate the unknown work factors by minimizing the mean square error. A dynamic method uses a Kalman filtering technique where the state includes the unknown work factors. For every step, only the present collected data is used since prior data is already reflected in the present estimates.

An agent for the load balancer collects estimates of work factors from all node agents. For a given request type, a weighted average of the work factor estimates for this request type from all the nodes is formed, in step 33. The weights are the request rate of that request type into the various nodes. Then, the process repeats (step 34) after a duration of an observation period has elapsed.

We now describe an exemplary embodiment using principles of the invention for a load balancer for the Session Initiation Protocol (SIP). As is known, SIP is a general-purpose signaling protocol used to control media sessions of all kinds, such as voice, video, instant messaging, and presence. SIP is a protocol of growing importance, with uses in Voice over Internet Protocol (VoIP), Instant Messaging (IM), IP Television (IPTV), Voice Conferencing, and Video Conferencing. Wireless providers are standardizing on SIP as the basis for the IP Multimedia System (IMS) standard for the Third Generation Partnership Project (3GPP). Third-party VoIP providers use SIP (e.g., Vonage), as do digital voice offerings from existing legacy Telcos (e.g., AT&T, Verizon) as well as their cable competitors (e.g., Comcast, Time-Warner).

While individual servers may be able to support hundreds or even thousands of users, large-scale Internet Service Providers (ISPs) need to support customers in the millions. A central component to providing any large-scale service is the ability to scale that service with increasing load and customer demands. A frequent mechanism to scale a service is to use some form of a load-balancing dispatcher that distributes requests across a cluster of servers. However, almost all research in this space has been in the context of either the Web (e.g., HyperText Transfer Protocol or HTTP) or file service (e.g., Network File Service or NFS). Hence, there is a need for new methods for load balancing techniques which are well suited to SIP and other Internet telephony protocols.

SIP is a transaction-based protocol designed to establish and tear down media sessions, frequently referred to as "calls." Two types of state exist in SIP. The first, session state, is created by the INVITE transaction and is destroyed by the BYE transaction. Each SIP transaction also creates state that exists for the duration of that transaction. SIP thus has overheads (e.g., central processing unit and/or memory requirements) that are associated both with sessions and with transactions, and leveraging this fact can result in more optimized SIP load balancing.

The fact that SIP is session-oriented has important implications for load balancing. Transactions corresponding to the same session should be routed to the same server in order for the system to efficiently access state corresponding to the session. Session-Aware Request Assignment (SARA) is the process by which a system assigns requests to servers in a manner so that sessions are properly recognized by the system and requests corresponding to the same session are assigned to the same server.

Another key aspect of the SIP protocol is that different transaction types, most notably the INVITE and BYE transactions, can incur significantly different overheads; INVITE transactions are about 75 percent more expensive than BYE transactions on certain illustrative systems. The load balancer can make use of this information to make better load balancing decisions which improve both response time and request throughput. In accordance with the invention, we demonstrate how the SARA process can be combined with estimates of relative overhead for different requests to improve load balancing.

In accordance with illustrative principles of the invention, and as will be described below in detail, the following load balancing algorithms can be used for load balancing in the presence of SIP. They combine the notion of Session-Aware Request Assignment (SARA), dynamic estimates of server load (in terms of occupancy), and knowledge of the SIP protocol:

Call-Join-Shortest-Queue (CJSQ) tracks the number of calls allocated to each back-end node and routes new SIP calls to the node with the least number of active calls.

Transaction-Join-Shortest-Queue (TJSQ) routes a new call to the server that has the fewest active transactions rather than the fewest calls. This algorithm improves on CJSQ by recognizing that calls in SIP are composed of the two transactions, INVITE and BYE, and that by tracking their completion separately, finer-grained estimates of server load can be maintained. This leads to better load balancing, particularly since calls have variable length and thus do not have a unit cost.

Transaction-Least-Work-Left (TLWL) routes a new call to the server that has the least work, where work (i.e., load) is based on estimates of the ratio of transaction costs. TLWL takes advantage of the observation that INVITE transactions are more expensive than BYE transactions. For different systems, the cost ratio for INVITE and BYE requests may differ. The algorithm depicted in FIG. 2 provides an exemplary method for determining the cost ratio and thus results in optimal performance for TLWL.

We have implemented these algorithms in software by adding them to the OpenSER open-source SIP server (http://www.openser.org/) and evaluated them using the SIPp open-source workload generator (http://sipp.sourceforge.net/) driving traffic through the load balancer to a cluster of servers running IBM's WebSphere Application Server (WAS) (http://www-306.ibm.com/software/webservers/appserv/was/). We have run many experiments conducted on a dedicated testbed of Intel x86-based servers connected via Gigabit Ethernet, and these demonstrated that the algorithms offer considerably better performance than any of the existing approaches we tested.

Figure 4:
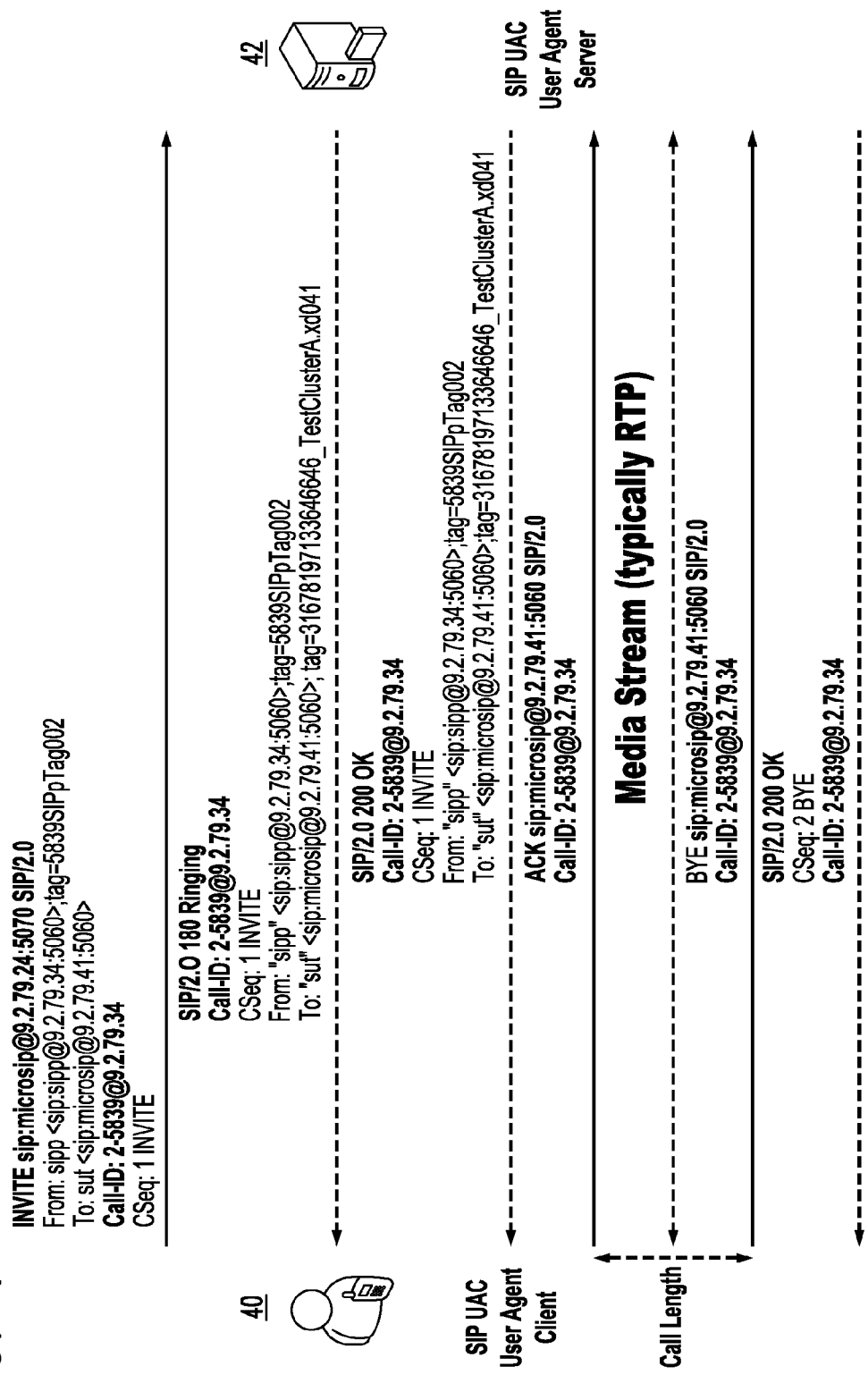
FIG. 4 illustrates how the SIP protocol may be used in accordance with an embodiment of the present invention.

SIP is a control-plane protocol designed to establish, alter, and terminate media sessions between two or more parties. For example, as generally illustrated in FIG. 4, SIP messages are exchanged between a User Agent Client 40 and a User Agent Server 42. The core Internet Engineering Task Force (IETF) SIP specification is given in RFC 3261 ("SIP: Session Initiation Protocol," Rosenberg et. al, IEFT RFC 3261, the disclosure of which is incorporated by reference herein). Several kinds of sessions can be used, including voice, text, and video, which are transported over a separate data-plane protocol. This separation of the data plane from the control plane is one of the key features of SIP and contributes to its flexibility. SIP was designed with extensibility in mind; for example, the SIP protocol requires that proxies forward and preserve headers that they do not understand.

As other examples, SIP can run over many protocols such as User Datagram Protocol (UDP), Transmission Control Protocol (TCP), Secure Sockets Layer (SSL), Stream Control Transmission Protocol (SCTP), Internet Protocol version 4 (IPv4) and Internet Protocol version 6 (IPv6). SIP does not allocate and manage network bandwidth as does a network resource reservation protocol such as RSVP; that is considered outside the scope of the protocol. SIP is a text-based protocol that derives much of its syntax from HTTP (http://www.w3.org/Protocols/). Messages contain headers and, additionally, bodies, depending on the type of message.

For example, in Voice over IP (VoIP), SIP messages contain an additional protocol, the Session Description Protocol (SDP) ("An Offer/Answer Model with the Session Description Protocol (SDP)", Rosenberg, Schulzrinne, IETF RFC 3264, the disclosure of which is incorporated by reference herein), which negotiates session parameters (e.g., which voice codec to use) between end points using an offer/answer model. Once the end hosts agree to the session characteristics, the Real-time Transport Protocol (RTP) is typically used to carry voice data ("RTP: A Transport Protocol for Real-Time Applications", Schulzrinne et al, IETF RFC 3550, the disclosure of which is incorporated by reference herein). After session setup, endpoints usually send media packets directly to each other in a peer-to-peer fashion, although this can be complex if network middleboxes such as Network Address Translation (NAT) or firewalls are present.

A SIP Uniform Resource Identifier (URI) uniquely identifies a SIP user, e.g., sip:hongbo@us.ibm.com. This layer of indirection enables features such as location-independence and mobility.

SIP users employ end points known as user agents. These entities initiate and receive sessions. They can be either hardware (e.g., cell phones, pagers, hard VoIP phones) or software (e.g., media mixers, IM clients, soft phones). User agents are further decomposed into User Agent Clients (UAC) and User Agent Servers (UAS), depending on whether they act as a client in a transaction (UAC) or a server (UAS). Most call flows for SIP messages thus display how the UAC and UAS behave for that situation.

SIP uses HTTP-like request/response transactions. A transaction is composed of a request to perform a particular method (e.g., INVITE, BYE, CANCEL, etc.) and at least one response to that request. Responses may be provisional, namely, that they provide some short term feedback to the user (e.g., TRYING, RINGING) to indicate progress, or they can be final (e.g., OK, 407 UNAUTHORIZED). The transaction is completed when a final response is received, but not with only a provisional response.

SIP is composed of four layers, which define how the protocol is conceptually and functionally designed, but not necessarily implemented. The bottom layer is called the syntax/encoding layer, which defines message construction. This layer sits above the IP transport layer, e.g., UDP or TCP. SIP syntax is specified using an augmented Backus-Naur Form grammar (ABNF). The next layer is called the transport layer. This layer determines how a SIP client sends requests and handles responses, and how a server receives requests and sends responses. The third layer is called the transaction layer. This layer matches responses to requests, manages SIP application-layer timeouts, and retransmissions. The fourth layer is called the transaction user (TU) layer, which may be thought of as the application layer in SIP. The TU creates an instance of a client request transaction and passes it to the transaction layer.

A dialog is a relationship in SIP between two user agents that lasts for some time period. Dialogs assist in message sequencing and routing between user agents, and provide context in which to interpret messages. For example, an INVITE message not only creates a transaction (the sequence of messages for completing the INVITE), but also a dialog if the transactions completes successfully. A BYE message creates a new transaction and, when the transaction completes, ends the dialog. In a VoIP example, a dialog is a phone call, which is delineated by the INVITE and BYE transactions.

An example of a SIP message is as follows:

```
INVITE sip:voicemail@us.ibm.com SIP/2.0
Via: SIP/2.0/UDP sip-proxy.us.ibm.com:5060;branch=z9hG4bK74bf9
Max-Forwards: 70
From: Hongbo <sip:hongbo@us.ibm.com>;tag=9fxced76sl
To: VoiceMail Server <sip:voicemail@us.ibm.com>
Call-ID: 38482762982201885 11@hongbo-thinkpad.watson.ibm.com
CSeq: 1 INVITE
Contact: <sip:hongbo@hongbo-thinkpad.watson.ibm.com;transport=udp>
Content-Type: application/sdp
Content-Length: 151
v=0
o=hongbo 2890844526 2890844526 IN IP4
hongbo-thinkpad.watson.ibm.com
s=-
c=IN IP4 9.2.2.101
t=0 0
m=audio 49172 RTP/AVP 0
a=rtpmap:0 PCMU/8000
```

In this message, the user hongbo@us.ibm.com is contacting the voicemail server to check his voicemail. This message is the initial INVITE request to establish a media session with the voicemail server. An important line to notice is the Call-ID: header, which is a globally unique identifier for the session that is to be created. Subsequent SIP messages must refer to that Call-ID to look up the established session state. If the voicemail server is provided by a cluster, the initial INVITE request will be routed to one back-end node, which will create the session state. Barring some form of distributed shared memory in the cluster, subsequent packets for that session must also be routed to the same back-end node, otherwise the packet will be erroneously rejected. Thus, a SIP load balancer could use the Call-ID in order to route a message to the proper node.

Given the above description of features of SIP, we now present the design and implementation of a load balancer for SIP in accordance with illustrative embodiments of the invention.

This section presents the design and implementation of a load balancer for SIP in accordance with the present invention which we have designed and extensively tested.

Figure 5:
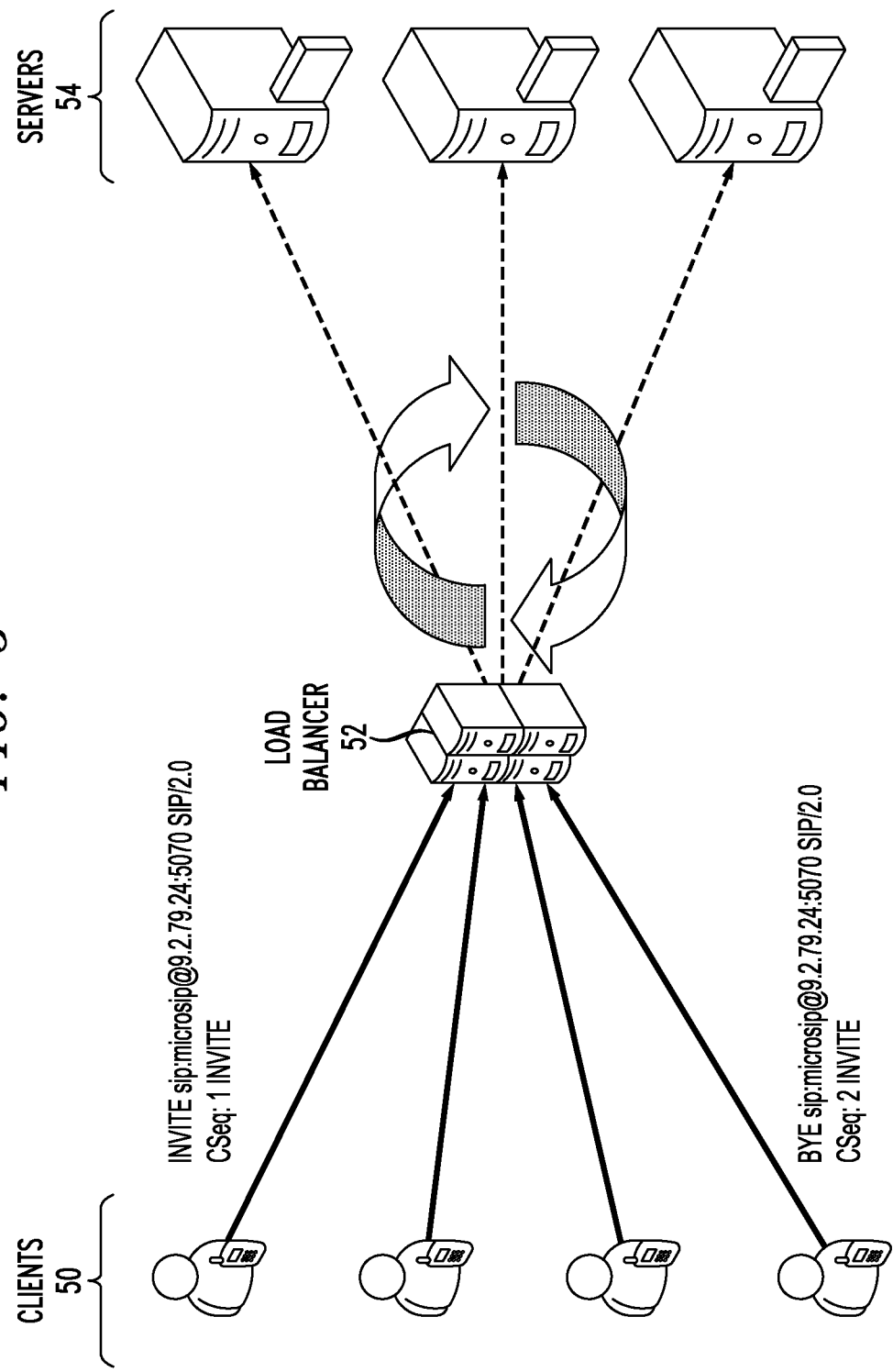
FIG. 5 depicts a scalable system for handling calls in accordance with an embodiment of the present invention.

FIG. 5 depicts our overall system. Requests from SIP User Agent Clients are sent to our load balancer which then selects a SIP server to handle each request. The various load balancing algorithms presented in this paper use different methods for picking SIP servers to handle requests. Servers send responses to SIP requests (such as 180 TRYING or 200 OK) to the load balancer which then sends each response to the client.

FIG. 5 depicts a scalable system for handling calls in accordance with an embodiment of the present invention. Requests from SIP User Agent Clients 50 are sent to load balancer 52 which then selects a SIP server from among a cluster of servers 54 to handle each request. The various load balancing algorithms presented herein according to principles of the invention use different methods for picking SIP servers to handle requests. Servers send responses to SIP requests (such as 180 TRYING or 200 OK) to the load balancer which then sends each response to the client.

A key aspect of our load balancer is that it implements Session-Aware Request Assignment (SARA) so that requests corresponding to the same session (call) are routed to the same server. The load balancer has the freedom to pick a server to handle the first request of a call. All subsequent requests corresponding to the call go to the same server. This allows all requests corresponding to the same session to efficiently access state corresponding to the session. SARA is important for SIP and is usually not implemented in HTTP load balancers.

The three load balancing algorithms, CJSQ, TJSQ, and TLWL, are based on assigning calls to servers by picking the server with the (estimated) least amount of work assigned but not yet completed.

In our system, the load balancer can estimate the work assigned to a server based on the requests it has assigned to the server and the responses it has received from the server. Responses from servers to clients first go through the load balancer which forwards the responses to the appropriate clients. By monitoring these responses, the load balancer can determine when a server has finished processing a request or call and update the estimates it is maintaining for the work assigned to the server.

The Call-Join-Shortest-Queue (CJSQ) algorithm estimates the amount of work a server has left to do based on the number of calls (sessions) assigned to the server. Counters may be maintained by the load balancer indicating the number of calls assigned to a server. When a new INVITE request is received (which corresponds to a new call), the request is assigned to the server with the lowest counter, and the counter for the server is incremented by one. When the load balancer receives an OK response to the BYE corresponding to the call, it knows that the server has finished processing the call and decrements the counter for the server.

It is to be appreciated that the number of calls assigned to a server is not always an accurate measure of the load on a server. There may be long idle periods between the transactions in a call. In addition, different calls may be composed of different numbers of transactions and may consume different amounts of server resources. An advantage of CJSQ is that it can be used in environments in which the load balancer is aware of the calls assigned to servers but does not have an accurate estimate of the transactions assigned to servers.

An alternative method is to estimate server load based on the transactions (requests) assigned to the servers. The Transaction-Join-Shortest-Queue (TJSQ) algorithm estimates the amount of work a server has left to do based on the number of transactions (requests) assigned to the server. Counters are maintained by the load balancer indicating the number of transactions assigned to each server. When a new INVITE request is received (which corresponds to a new call), the request is assigned to the server with the lowest counter, and the counter for the server is incremented by one. When the load balancer receives a request corresponding to an existing call, the request is sent to the server handling the call, and the counter for the server is incremented. When the load balancer receives an OK response for a transaction, it knows that the server has finished processing the transaction and decrements the counter for the server.

It is to be appreciated that, in the TJSQ approach, transactions are weighted equally. There are many situations in which some transactions are more expensive than others, and this should ideally be taken into account in making load balancing decisions. In the SIP protocol, INVITE requests consume more overhead than BYE requests.

Figure 11:
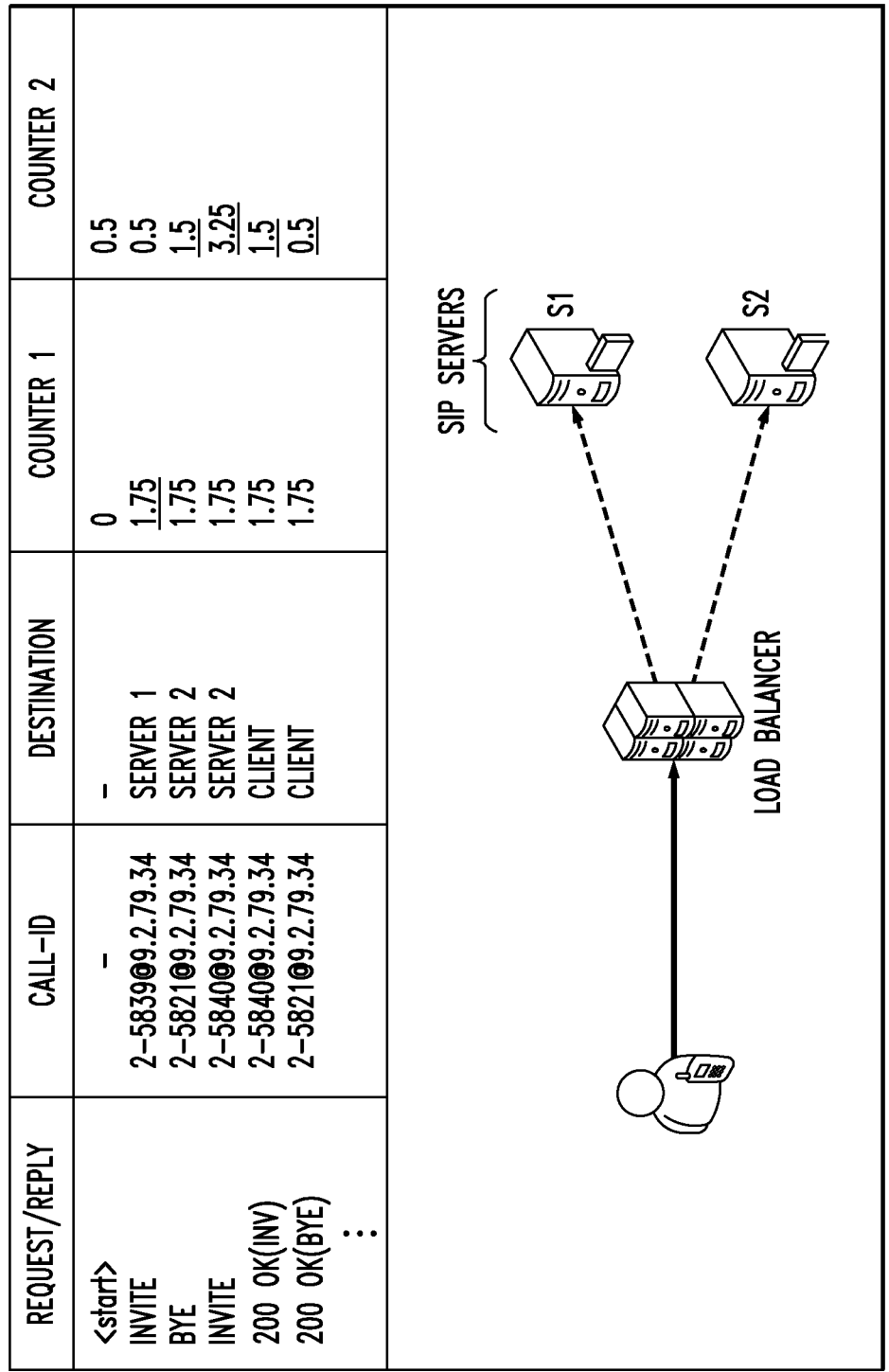
FIG. 11 depicts the use of the TLWL load balancing algorithm in accordance with an embodiment of the invention.

The Transaction-Least-Work-Left (TLWL) algorithm addresses this issue by assigning different weights to different transactions depending on their expected overhead. It is similar to TJSQ with the enhancement that transactions are weighted by overhead; in the special case that all transactions have the same expected overhead, TLWL and TJSQ are the same. Counters are maintained by the load balancer indicating the weighted number of transactions assigned to each server. New calls are assigned to the server with the lowest counter. Different systems may have different overheads for INVITE and BYE transactions. FIG. 2, described above, provides an exemplary method for determining the overheads of INVITE and BYE requests. FIG. 11 presents a simple example of how TLWL can be used to balance load in a system with two servers (s1 and s2) when a weight of 1.75 is assumed. In practice, it scales well to a much larger number of servers.

The presentation of the load balancing algorithms so far assumes that the servers have similar processing capacities. In some situations, the servers may have different processing capabilities. Some servers may be more powerful than others. One server might have all of its resources available for handling SIP requests from the load balancer, while another server might only have a fraction of its resources available for such requests. In these situations, the load balancer should assign a new call to the server with the lowest value of estimated work left to do (as determined by the counters) divided by the capacity of the server; this applies to CJSQ, TJSQ, and TLWL.

A simpler form of TJSQ could be deployed for applications in which SARA is not needed. For example, consider a Web-based system communicating over HTTP. The load balancer would have the flexibility to assign requests to servers without regard for sessions. It would maintain information about the number of requests assigned to each server. The key support that the load balancer would need from the server would be a notification of when a request has completed. In systems for which all responses from the server first go back to the load balancer which then forwards the responses to the client, a response from the server would serve as the desired notification, so no further support from the server would be needed.

This system could further be adapted to a version of TLWL without SARA if the load balancer is a content-aware layer 7 switch. In this case, the load balancer has the ability to examine the request and also receives responses from the server; no additional server support would be required for the load balancer to keep track of the number of requests assigned to each server. Based on the contents of the request, the load balancer could assign relative weights to the requests. For example, a request for a dynamic page requiring invocation of a server program could be assigned a higher weight than a request for a file. The load balancer could use its knowledge of the application to assign different weights to different requests.

Another method is to make load balancing decisions based on server response times. The Response-time Weighted Moving Average (RWMA) algorithm assigns calls to the server with the lowest weighted moving average response time of the last n (20 in our illustrative implementation) response time samples. The formula for computing the RWMA linearly weights the measurements so that the load balancer is responsive to dynamically changing loads, but does not overreact if the most recent response time measurement is highly anomalous. The most recent sample has a weight of n, the second most recent a weight of n−1, and the oldest a weight of one. The load balancer determines the response time for a request based on the time when the request is forwarded to the server and the time the load balancer receives a 200 OK reply from the server for the request.

We have also implemented a couple of simple load balancing algorithms which do not require the load balancer to estimate server load, response times, or work remaining to be done.

The hash algorithm is a static approach for assigning calls to servers based on Call-ID which is a string contained in the header of a SIP message identifying the call to which the message belongs. A new INVITE transaction with Call-ID x is assigned to server (Hash(x) mod N), where Hash(x) is a hash function and N is the number of servers. We have used both a hash function provided by OpenSer and FNV hash. OpenSer refers to the open SIP express router (http://www.openser.org) and FNV hash refers to Landon Curt Noll, Fowler/noll/vo (fnv) (http://isthe.com/chongo/tech/comp/fnv/).

The hash algorithm is not guaranteed to assign the same number of calls to each server. The Round Robin (RR) algorithm guarantees a more equal distribution of calls to servers. If the previous call was assigned to server M, the next call is assigned to server (M+1) mod N, where N is again the number of servers in the cluster.

To summarize the previous discussion, we have proposed several session-aware request assignment (SARA) algorithms including but not limited to:

Hash. Given a Call-ID x, the node assigned is (Hash(x) mod N), where N is the number of nodes. Note this algorithm is completely static.

Round Robin (RR). This algorithm tracks where the last session assignment was made. Given that the previous assignment was made to node M, the next session is assigned to node (M+1) mod N, where N is again the number of nodes in the cluster.

Response-time Weighted Moving Average (RWMA). This algorithm tracks the average response time for each back-end node and allocates sessions to the node with the smallest estimate of response time.

Call-Join-Shortest-Queue (CSJQ). This algorithm tracks call assignment to each node by tracking requests. When a new INVITE arrives, the request is assigned to the node with the fewest calls. The counter for that node is increased by one, and is decremented only when the OK response to the BYE is seen.

Transaction-Join-Shortest-Queue (TSJQ). This algorithm tracks transaction assignment to each node. When a new INVITE arrives, the request is assigned to the node with the fewest transactions. Transaction counts are incremented when the request arrives (INVITE, BYE) and decremented when that transaction completes (the appropriate OK for that transaction is seen). Transactions are assumed to have the same weight, except for ACK, which has no weight.

Transaction-Least-Work-Left (TLWL). This algorithm is similar to TJSQ above, except that rather than each transaction having the same weight, INVITE transactions have a higher weight than BYE transactions. When a new INVITE arrives, the session is assigned to a node with a lowest total sum of weights corresponding to requests assigned but not completed by the node. Here we distinguish the weights for INVITE and BYE since we observe that the INVITE request poses more work to the server than the BYE.

Below is the pseudocode for a main loop of a load balancer in accordance with an embodiment of the present invention:

```
h = hash call-id
look up session in active table
if not found
    /* don't know this session */}
    if INVITE
        /* new session */
        select one node d using algorithm
            (TLWL, TJSQ, RR, Hash, etc)
        add entry (s,d,ts) to active table
        s = STATUS_INV
        node_counter[d] += w_inv
    /* non-invites omitted for clarity */
else /* this is an existing session */
    if 200 response for INVITE
        s = STATUS_INV_200
        record response time for INVITE
        node_counter[d] -= w_inv
    else if ACK request
        s = STATUS_ACK
    else if BYE request
        s = STATUS_BYE
        node_counter[d] += w_bye
    else if 200 response for BYE
        s = STATUS_BYE_200
        record response time for BYE
        node_counter[d] -= w_bye
        move entry to expired table
/* end session lookup check */
if request (INVITE, BYE etc.)
    forward to d
else if response (200/100/180/481)
    forward to client
```

Figure 8:
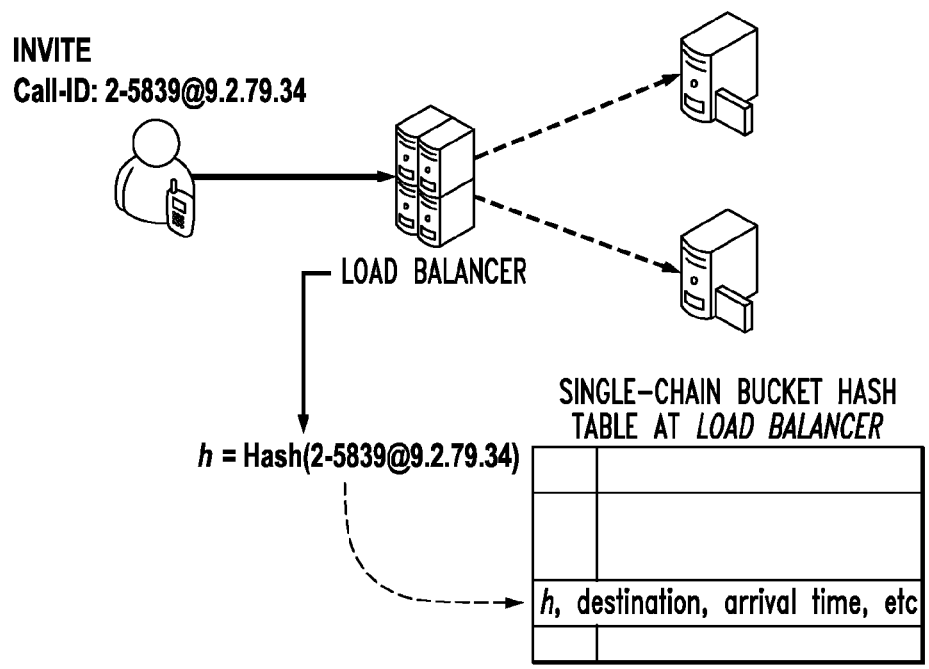
FIGS. 8-10 show how session affinity can be maintained using a hash table in accordance with an embodiment of the present invention.
Figure 9:
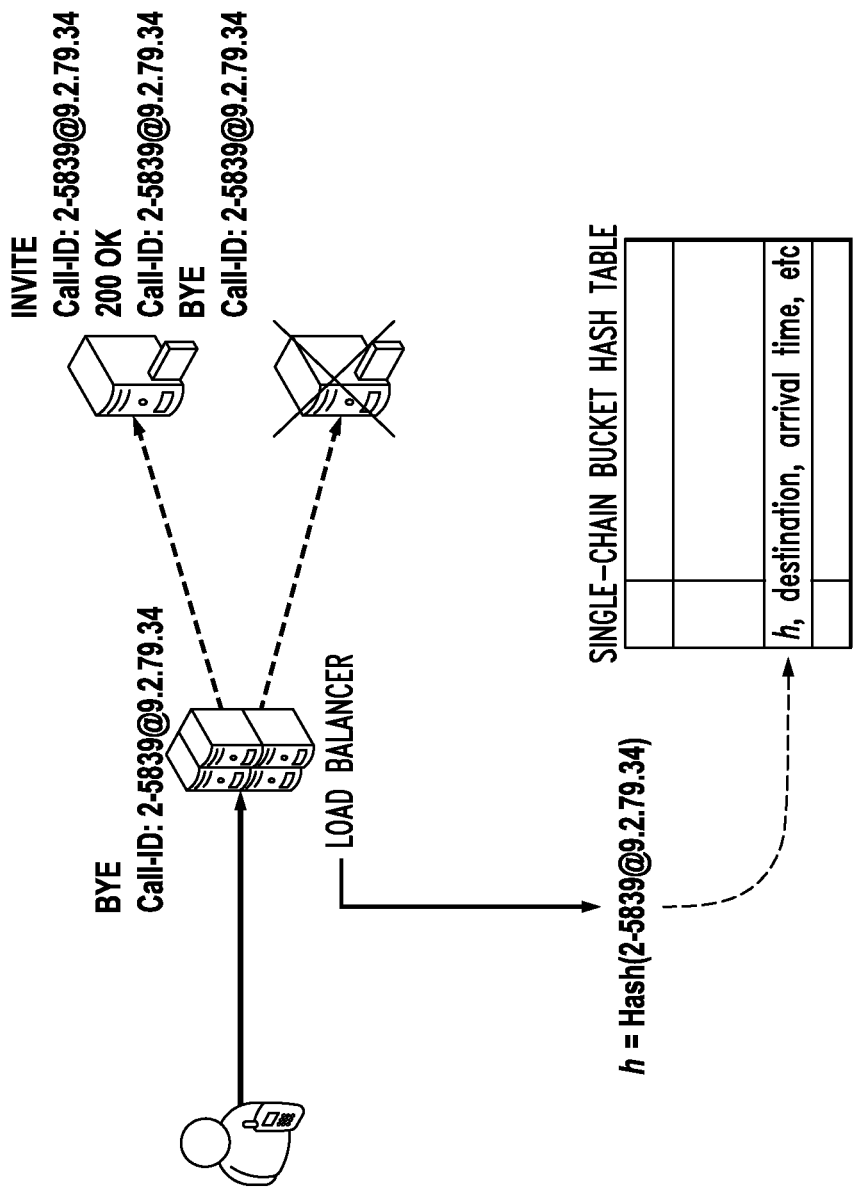
Figure 10:
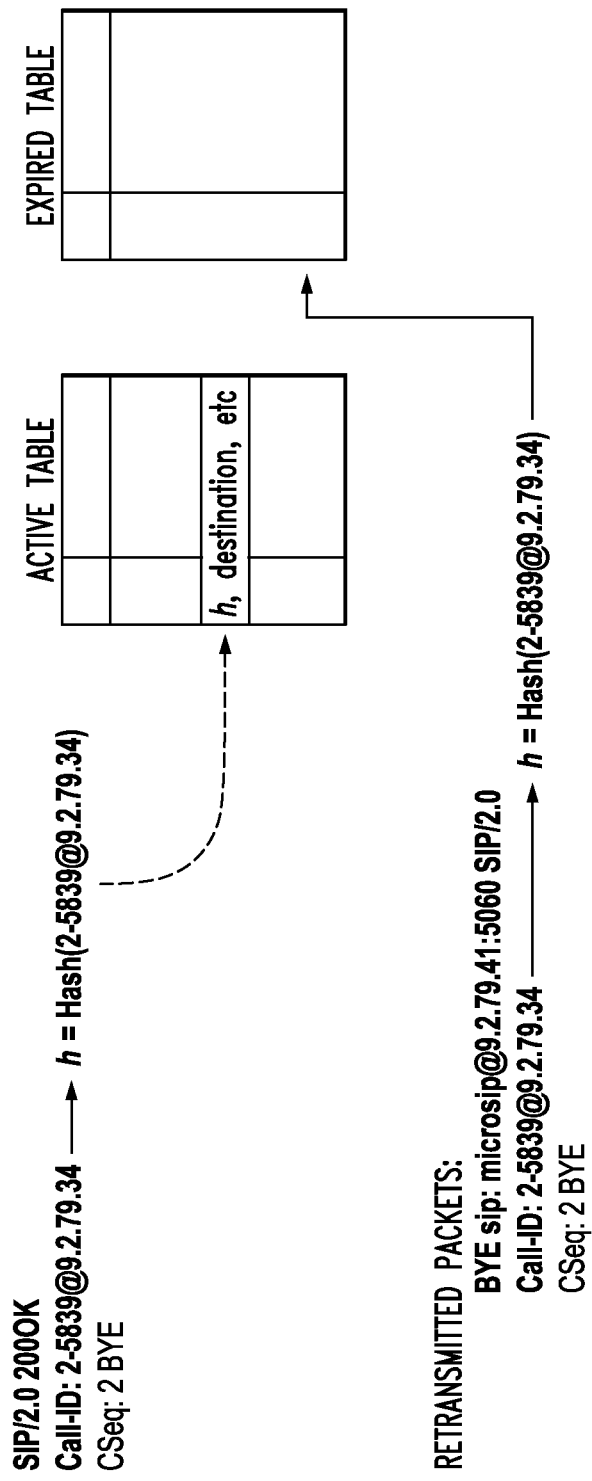

The pseudocode is intended to convey the general approach of the load balancer; it omits certain corner cases and error handling (for example, for duplicate packets). The essential approach is to identify SIP packets by their Call-ID and use that as a hash key for table lookup in a chained bucket hash table, as illustrated in FIGS. 8-10. Two hash tables are maintained: an active table that maintains active sessions and transactions, and an expired table which is used for routing stray duplicate packets for requests that have already completed. This is analogous to the handling of old duplicate packets in TCP when the protocol state machine is in the TIME-WAIT state. When sessions are completed, their state is moved into the expired hash table. Expired sessions eventually time out and are garbage collected. Below is the pseudocode for a garbage collector in accordance with an embodiment of the invention:

```
T_1 threshold|
ts0: current time|
for (each entry) in expired hash table
    if ts0 − is > T_1
        remove the entry
```

In accordance with an illustrative embodiment, the load balancer selects the appropriate server to handle the first request of a call. It also maintains mappings between calls and servers using two hash tables which are indexed by call ID. The active hash table maintains call information on calls the system is currently handling After the load balancer receives a 200 status message from a server in response to a BYE message from a client, the load balancer moves the call information from the active hash table to the expired hash table so that the call information is around long enough for the client to receive the 200 status message that the BYE request has been processed by the server. Information in the expired hash table is periodically reclaimed by garbage collection. Both hash tables store multiple entities which hash to the same bucket in a linked list.

The hash table information for a call identifies which server is handling requests for the call. That way, when a new transaction corresponding to the call is received, it will be routed to the correct server.

Part of the state of the SIP machine is effectively maintained using a status variable; this helps identify retransmissions. When a new INVITE request arrives, a new node is assigned, depending on the algorithm used. BYE and ACK requests are sent to the same machine where the original INVITE was assigned to. For algorithms that use response time, the response time of the individual INVITE and BYE requests are recorded when they are completed. An array of node counter values is kept that tracks occupancy of INVITE and BYE requests, according to weight; the weight values are described in the particular algorithm below.

We found that the choice of hash function affects the efficiency of the load balancer. The hash function used by OpenSER did not do a very good job of distributing call IDs across hash buckets. Given a sample test with 300,000 calls, OpenSER's hash function only spread the calls to about 88,000 distinct buckets. This resulted in a high percentage of buckets containing several call ID records; searching these buckets adds overhead.

We experimented with several different hash functions and found FNV hash (Landon Curt Noll, "Fowler/Noll/Vo (FNV) Hash") to be a preferred one. For that same test of 300,000 calls, FNV Hash mapped these calls to about 228,000 distinct buckets. The average length of searches was thus reduced by a factor of almost three.

Figure 6:
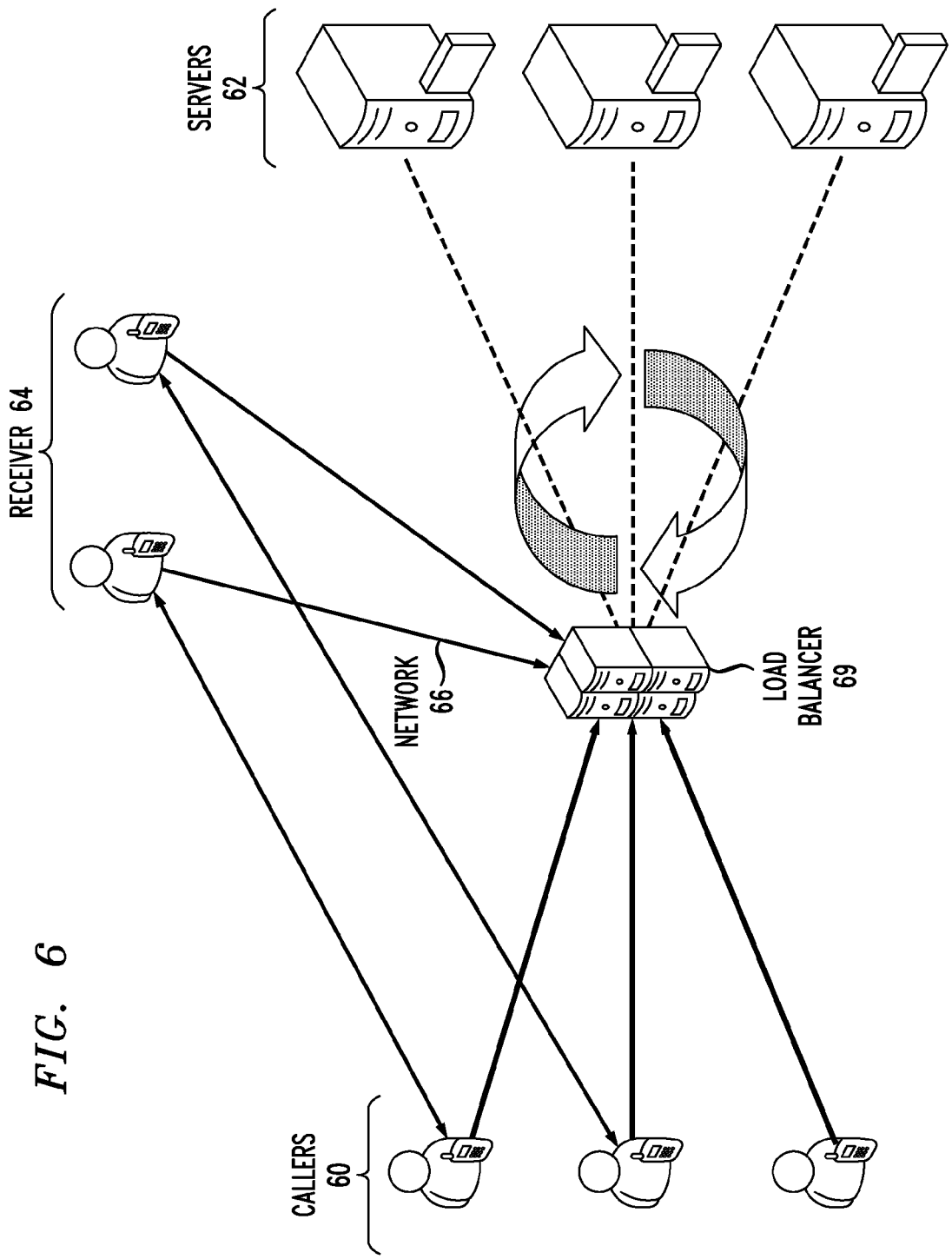
FIG. 6 depicts a scalable system for handling calls in accordance with an embodiment of the present invention.

FIG. 6 shows a system in which features according to the invention may be implemented (i.e., the above-described methodologies and algorithms) The figure shows a plurality of callers 60 and receivers 64. A "receiver" refers to an entity or device receiving a call from the "caller" (calling entity or device) via communication network 66. If a protocol such as SIP is being used, both callers 60 and receivers 64 can function as clients or user agent clients (UAC). In some cases, such as if SIP is being used as a communication protocol, the load balancer 69 may receive responses from servers 62 which it forwards to callers 60 and/or receivers 64.

Figure 7:
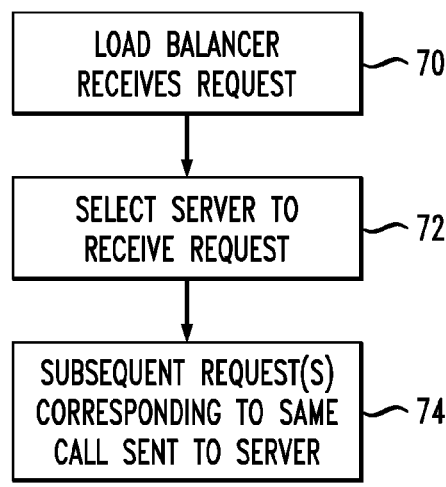
FIG. 7 depicts a method for load balancing requests to servers based on call ID in accordance with an embodiment of the present invention.

FIG. 7 shows a method for handling request traffic for a protocol such as SIP, in accordance with an embodiment of the invention, when it is desirable to route requests corresponding to a same call to a same server. The system maintains mappings between calls and servers via one or more hash tables mapping call IDs to server IDs as described above. In step 70, the load balancer 69 receives a request associated with a call. In step 72, a hash table is consulted to determine if there already is a server associated with the call ID. If so, processing proceeds to step 74 wherein the request is routed to the server corresponding to the call ID. If not, the system determines an appropriate server to handle the request as well as subsequent ones corresponding to the same call. Several methods can be used to select the server including but not limited to the TLWL, TJSQ, CSJQ, RWMA, RR, and hash methods described above.

The server could be selected based on estimated loads of back-end servers. If the servers all have similar request handling capacity, it is preferable to pick the least loaded server or one of the least loaded servers. There are several ways to estimate load on the back-end servers. The TLWL, TSJQ, CSJQ, and RWMA algorithms use different methods for estimating load on back-end servers. TLWL estimates an aggregate amount of work assigned to servers based on requests which have not completed. RWMA estimates response times of servers in order to pick a server to receive the request. One method for selecting a server is to pick a server with a lowest response time or lowest estimated response time.

In some cases, the servers will not have the same processing power. For example, one server s1 might have a considerably more powerful central processing unit (CPU) than another server s2. In another scenario, even though s1 and s2 might have similar CPU capacity, 30% of the processing power for s1 might be devoted to another application, while for s2, all of the processing power is dedicated to handling Internet telephony requests. In either case, we can take these factors into consideration in making load balancing decisions. For example, we can define the capacity of a server as the amount of resources (e.g. CPU resources; the capacity of the server could be equal to or proportional to CPU capacity) the server can devote to the Internet telephony application. Capacity will be higher for a more powerful server. It will also be higher for a server which has a greater percentage of its resources dedicated to handling Internet telephony requests.

Using this approach, the load or estimated load on a server can be divided by the capacity of the server in order to determine the weighted load for the server. A server with a least weighted load can be selected in step 42 instead of a server with a least load. If load is estimated based on an amount of work left to do, then the amount of work left to do (which is typically estimated and may not be exact) can be divided by the capacity of the server in order to determine the weighted work left. A server with a least weighted work left to do can be selected in step 42 instead of a server with a least work left to do.

CJSQ, TSJQ, and TLWL are examples of algorithms which select a server based on an estimated least work left to do by the server. CJSQ estimates work left to do by the number of calls assigned to a server. A call can include multiple requests. TSJQ estimates work left to do based on the number of requests assigned to a server. TLWL takes into account the fact that different requests have different overheads. It estimates the amount of work a server has left to do based on the number of requests assigned to the server weighted by the relative overheads of the requests. INVITE requests consume more resources than BYE requests. Therefore, TLWL weights INVITE requests more heavily than BYE requests.

The ratio resulting in optimal performance is not always known and may vary for different systems. We can start with an initial estimate of the relative overheads and then apply the algorithm in FIG. 2 to obtain very accurate estimates of the overheads for INVITE and BYE requests. We can then plug the values obtained by the algorithm in FIG. 2 for the overheads of INVITE and BYE requests to get a very effective load balancing algorithm.

After the server has been selected, the request is sent to the selected server. In addition, the load balancer needs to maintain state information so that subsequent requests corresponding to the call will be routed to the correct server in step 74. One way of doing this is to store the mapping between the call ID and server ID in a hash table(s), as described above.

To reiterate, as described above, FIGS. 8-10 show how session affinity can be maintained using a hash table in accordance with an embodiment of the present invention.

As depicted in FIG. 8, the load balancer will keep call state for the entire duration of the call. That is, the load balancer builds a data structure (such as a hash table, as illustrated) to record the routes of calls when receiving the first request of a call and making a routing decision based on a specific dispatch algorithm. Dictionary lookups in the data structure could be based on the call-id, the caller or the receiver of the call.

As depicted in FIG. 9, upon receiving subsequent requests corresponding to the call, the load balancer looks up the route in the data structure and then sends the request to the destination node accordingly.

When a call is terminated, the corresponding entry in the active data structure (active table) should be removed to an expired data structure (expired table). This is illustrated in FIG. 10 (see retransmitted packets).

To reiterate, as described above, FIG. 11 presents a simple example of how TLWL can be used to balance load (via a load balancer configured in accordance with principles of the invention) in a system with two back-end nodes (servers S1 and S2). The example, inter alia, depicts the content of the counters maintained by the load balancer.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 11, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-11, can also include, as described herein, providing a system, wherein the system includes distinct modules (e.g., modules comprising software, hardware or software and hardware). By way of example only, the modules may include but are not limited to an overhead estimator module, a server selector module, an overhead estimate variation module, and an absolute task overhead determination module. These and other modules may be configured, for example, to perform the steps described and illustrated in the context of FIGS. 1-11.

Figure 12:
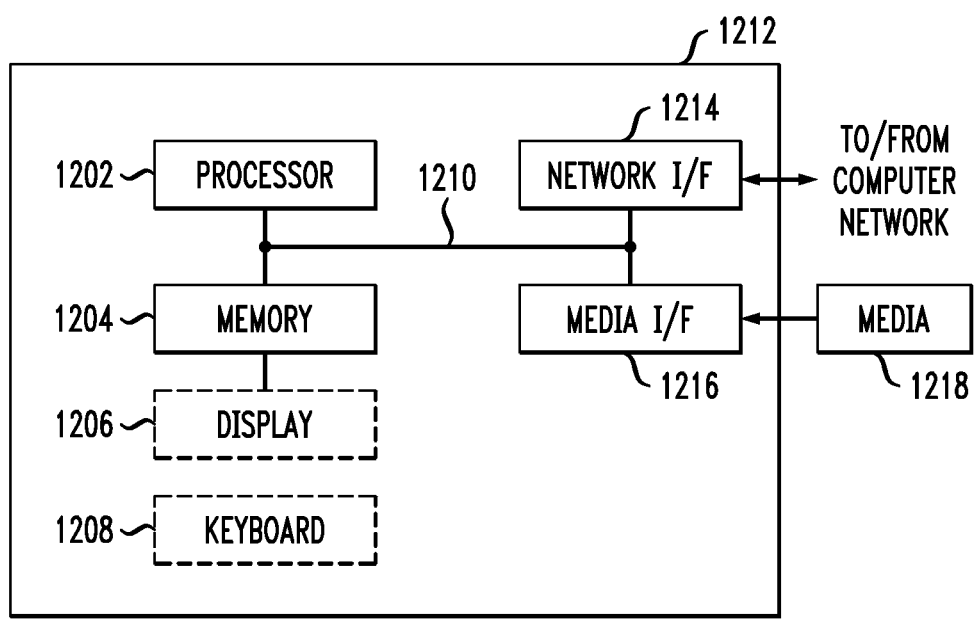
FIG. 12 depicts a computer system in accordance with which one or more components/steps of the techniques of the invention may be implemented.

One or more embodiments can make use of software running on a general purpose computer or workstation. With reference to FIG. 12, such an implementation 1200 employs, for example, a processor 1202, a memory 1204, and an input/output interface formed, for example, by a display 1206 and a keyboard 1208. The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include (but not be limited to) one or more mechanisms for inputting data to the processing unit (for example, keyboard or mouse), and one or more mechanisms for providing results associated with the processing unit (for example, display or printer).

The processor 1202, memory 1204, and input/output interface such as display 1206 and keyboard 1208 can be interconnected, for example, via bus 1210 as part of a data processing unit 1212. Suitable interconnections, for example, via bus 1210, can also be provided to a network interface 1214, such as a network card, which can be provided to interface with a computer network, and to a media interface 1216, such as a diskette or CD-ROM drive, which can be provided to interface with media 1218.

A data processing system suitable for storing and/or executing program code can include at least one processor 1202 coupled directly or indirectly to memory elements 1204 through a system bus 1210. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 1208, display 1206, pointing device, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a computer system comprising a plurality of computing devices wherein the plurality of computing devices processes a plurality of tasks, a method for determining overheads associated with task types comprising the steps of:
   estimating overheads for the plurality of tasks wherein each task has a task type and the plurality of tasks has a plurality of task types;
   selecting one of the plurality of computing devices to execute one of the plurality of tasks, wherein the selection comprises estimating load on at least a portion of the plurality of computing devices from tasks assigned to at least a portion of the plurality of computing devices that are waiting to be executed and the estimates of overheads of the plurality of task types;
   collecting rates at which the system can process tasks for the estimates of overheads of the plurality of task types for a period;
   varying one or more of the estimates of overheads of the plurality of task types and continuing collection of the rates at which the system can process the tasks as the one or more estimates of overheads are varied over one or more periods until a set of estimates resulting in a maximal rate at which the system can process tasks is determined; and
   using the set of estimates resulting in the maximal rate at which the system can process tasks to determine at least one absolute overhead for the task.

2. The method of claim 1, wherein the overheads comprise relative overheads whereby the overhead for a first task type is defined relative to the overhead of a second task type.

3. The method of claim 1, wherein the step of selecting one of the plurality of computing devices to execute one of the plurality of tasks is based on a least-work-left load balancing algorithm.

4. The method of claim 3, wherein the-least-work-left load balancing algorithm estimates work that a given computing device has to do based on a number of requests assigned to the given computing device but not yet completed by the given computing device.

5. The method of claim 3, wherein the least-work-left load balancing algorithm takes into consideration relative overheads associated with different requests.

6. The method of claim 1, wherein the plurality of tasks comprise Session Initiation Protocol (SIP) requests.

7. The method of claim 6, wherein the overheads comprise overheads of INVITE and BYE requests.

8. The method of claim 1, wherein the plurality of tasks comprise HyperText Transfer Protocol (HTTP) requests.

9. The method of claim 1, wherein the computer system further comprises a load balancer and the plurality of computing devices comprise servers and wherein the load balancer assigns requests to servers using a least-work-left algorithm.

10. The method of claim 1, wherein the computer system further comprises a load balancer and the plurality of computing devices comprise servers and wherein the load balancer assigns requests to servers using a transaction-least-work-left algorithm.

11. In a computer system comprising a plurality of computing devices wherein the plurality of computing devices processes a plurality of tasks, an apparatus for determining overheads associated with task types comprising:
a memory; and
one or more processors coupled to the memory and configured to:
estimate overheads for the plurality of tasks wherein each task has a task type and the plurality of tasks has a plurality of task types;
select one of the plurality of computing devices to execute one of the plurality of tasks, wherein the selection comprises estimating load on at least a portion of the plurality of computing devices from tasks assigned to at least a portion of the plurality of computing devices that are waiting to be executed and the estimates of overheads of the plurality of task types;
collect rates at which the system can process tasks for the estimates of overheads of the plurality of task types for a period;
vary one or more of the estimates of overheads of the plurality of task types and continue collection of the rates at which the system can process the tasks as the one or more estimates of overheads are varied over one or more periods until a set of estimates resulting in a maximal rate at which the system can process tasks is determined; and
use the set of estimates resulting in the maximal rate at which the system can process tasks to determine at least one absolute overhead for the task.

12. The apparatus of claim 11, wherein the overheads comprise relative overheads whereby the overhead for a first task type is defined relative to the overhead of a second task type.

13. The apparatus of claim 11, wherein the selection of one of the plurality of computing devices to execute one of the plurality of tasks is based on a least-work-left load balancing algorithm.

14. The apparatus of claim 13, wherein the-least-work-left load balancing algorithm estimates work that a given computing device has to do based on a number of requests assigned to the given computing device but not yet completed by the given computing device.

15. The apparatus of claim 13, wherein the least-work-left load balancing algorithm takes into consideration relative overheads associated with different requests.

16. The apparatus of claim 11, wherein the plurality of tasks comprise Session Initiation Protocol (SIP) requests.

17. The apparatus of claim 16, wherein the overheads comprise overheads of INVITE and BYE requests.

18. The apparatus of claim 11, wherein the plurality of tasks comprise HyperText Transfer Protocol (HTTP) requests.

19. The apparatus of claim 11, wherein requests are assigned to the plurality of computing devices using a least-work-left algorithm.

20. The apparatus of claim 11, wherein requests are assigned to the plurality of computing devices using a transaction-least-work-left algorithm.

21. An article of manufacture for determining overheads associated with task types in a computer system comprising a plurality of computing devices wherein the plurality of computing devices processes a plurality of tasks, the article of manufacture comprising a non-transitory computer readable storage medium tangibly embodying a computer readable program code which, when executed, causes one or more computers to:
estimate overheads for the plurality of tasks wherein each task has a task type and the plurality of tasks has a plurality of task types;
select one of the plurality of computing devices to execute one of the plurality of tasks, wherein the selection comprises estimating load on at least a portion of the plurality of computing devices from tasks assigned to at least a portion of the plurality of computing devices that are waiting to be executed and the estimates of overheads of the plurality of task types;
collect rates at which the system can process tasks for the estimates of overheads of the plurality of task types for a period;
vary one or more of the estimates of overheads of the plurality of task types and continue collection of the rates at which the system can process the tasks as the one or more estimates of overheads are varied over one or more periods until a set of estimates resulting in a maximal rate at which the system can process tasks is determined; and
use the set of estimates resulting in the maximal rate at which the system can process tasks to determine at least one absolute overhead for the task.

* * * * *